US012343773B2

(12) United States Patent
Loades

(10) Patent No.: US 12,343,773 B2
(45) Date of Patent: Jul. 1, 2025

(54) METHOD FOR CLEANING THE INSIDE OF PIPEWORK

(71) Applicant: ATAM Group Limited, Great Yarmouth (GB)

(72) Inventor: Mark Loades, Great Yarmouth (GB)

(73) Assignee: ATAM Group Limited, Great Yarmouth (GB)

( * ) Notice: Subject to any disclaimer, the term of this patent is extended or adjusted under 35 U.S.C. 154(b) by 0 days.

(21) Appl. No.: 17/640,513

(22) PCT Filed: Sep. 4, 2020

(86) PCT No.: PCT/GB2020/052132
§ 371 (c)(1),
(2) Date: Mar. 4, 2022

(87) PCT Pub. No.: WO2021/044166
PCT Pub. Date: Mar. 11, 2021

(65) Prior Publication Data
US 2022/0331847 A1 Oct. 20, 2022

(30) Foreign Application Priority Data
Sep. 5, 2019 (GB) ...................................... 1912788

(51) Int. Cl.
*B08B 9/043* (2006.01)

(52) U.S. Cl.
CPC ............ *B08B 9/0433* (2013.01); *B08B 9/043* (2013.01)

(58) Field of Classification Search
CPC .. B08B 9/0495–0497; B08B 9/04–057; B08B 9/00–46; B08B 3/00–14;
(Continued)

(56) References Cited

U.S. PATENT DOCUMENTS 6,523,554 B1 * 2/2003 Bryant, Sr. ............... E03F 9/00 210/162
6,686,950 B1 2/2004 Caffon et al.
(Continued)

FOREIGN PATENT DOCUMENTS

CA 2 500 048 A1 9/2006
DE 4426708 A1 * 2/1996
(Continued)

OTHER PUBLICATIONS

"Collector," noun, Merriam-Webster Dictionary, available at https://www.merriam-webster.com/dictionary/collector (Year: 2024).*
(Continued)

*Primary Examiner* — Michael E Barr
*Assistant Examiner* — Richard Z. Zhang
(74) *Attorney, Agent, or Firm* — Workman Nydegger

(57) ABSTRACT

A method of cleaning the inside of a pipework includes selecting a section of the pipework to be cleaned and determining a hold point of the pipework. A cleaning apparatus is inserted into an entry point of the pipework section, the apparatus being coupled to a fluid supply and equipped to blow the fluid along the pipework section from the first or last hold point to the entry point. The apparatus further includes an image recorder to obtain a visual record of the inside of the pipework. Insertion of the apparatus into the pipework continues until the apparatus reaches the hold point. A collector is secured over the entry point to collect debris blown from the pipework, and fluid supply is activated. The apparatus is moved from the hold to the entry point, so blowing debris towards and into the collector. On completion, the fluid supply is deactivated and the collector containing the collected debris removed from the entry point.

16 Claims, 9 Drawing Sheets

(58) Field of Classification Search
CPC . E03B 7/006; E03B 7/07; E03B 7/075; E03B 7/078; E03C 1/00–335; G06K 7/1417; E03F 1/00–11/00; E03F 9/00–007; F16D 1/00–71/04
See application file for complete search history.

(56) References Cited

U.S. PATENT DOCUMENTS

| | | | | |
|---|---|---|---|---|
| 2002/0102136 | A1 | 8/2002 | Holland | |
| 2008/0072963 | A1 | 3/2008 | Strohmeier et al. | |
| 2009/0188568 | A1 * | 7/2009 | Malka | B08B 9/0321 137/15.05 |
| 2010/0209606 | A1 * | 8/2010 | Munden | B08B 9/0551 427/230 |
| 2014/0345651 | A1 * | 11/2014 | MacKenzie | A62C 35/68 134/22.11 |
| 2016/0314329 | A1 * | 10/2016 | Papazian | G06K 19/06037 |
| 2016/0341320 | A1 * | 11/2016 | Taylor | F16K 17/00 |
| 2018/0038093 | A1 * | 2/2018 | Olsson | H01B 7/02 |

FOREIGN PATENT DOCUMENTS

| | | | | | |
|---|---|---|---|---|---|
| DE | 19619326 | A1 | * | 11/1997 | B08B 9/0495 |
| DE | 102009025701 | A1 | * | 12/2010 | |
| DE | 102017125733 | A1 | * | 5/2019 | |
| FR | 2 768 214 | A1 | | 3/1999 | |
| GB | 2276927 | | * | 10/1994 | B08B 9/0497 |
| GB | 2 332 032 | A | | 6/1999 | |
| WO | 2018/083462 | A1 | | 5/2018 | |

OTHER PUBLICATIONS

International Search Report and Written Opinion dated Dec. 15, 2020, issued in PCT Application No. PCT/GB2020/052132, filed Sep. 4, 2020.

* cited by examiner

METHOD FOR CLEANING THE INSIDE OF PIPEWORK

FIELD OF THE INVENTION

The present invention relates to a method of cleaning pipework such as ducting, pipelines or oil and gas process pipework. The cleaning is particularly suited to removing debris caused by construction and assembly of the pipework, prior to the pipework being commissioned for use or before a section is closed off, for example through the installation of a valve being installed within the pipework.

BACKGROUND TO THE INVENTION

When installing pipework, including associated elements such as branches of a main pipe, valve outlets, measuring apparatus or associated instrumentation, such aspects can either be completed on-site or in a construction factory from where the assembled pipe section or spool can be transported to the site. Although the latter option may provide transportation difficulties in moving the section between the two locations, the associated advantages are that on-site welding is reduced, which can often be more difficult than in a factory environment. Moreover, a factory can often have instrumentation to carry out tests on the spool before it leaves the factory, so improving quality assurance.

When spools from either of the above two options are welded together on-site, however, debris can accumulate on the inside of the pipework. This needs to be removed before the pipework is finally put into service as the debris can introduce contaminants into the fluid flowing through the pipework. Moreover, in-line valves can suffer damage if debris finds its way in the valve's internal workings. It is important therefore that the pipeline/process pipework be cleaned prior to its use.

Currently, once in-line welding is deemed to be complete, water is utilised to test the constructed partial pipeline. There are problems with this however. First, is that sufficient water needs to be to hand. Secondly, the water should not be allowed to run off into the environment as the welding materials can be toxic. Thirdly, the water itself will need to be removed: again, to avoid contamination of the fluid flowing within the pipeline. Also using water to flush the piping systems circulates the debris into the internal workings of the valves and static equipment. The water if not treated with the correct corrosion inhibitors can accelerate corrosion within the piping system.

A further disadvantage of current cleaning methods is that although the user may have carried out a cleaning process, there is usually no good way available to know whether the process has been successful. Following the above testing, prior art methods include a dewatering step. The system now awaits a pre-commission/commission step, during which it is inspected. This is carried out through the use of a camera passed into the pipework. Pockets of debris and possible oxidation sites are cleaned using hydrojetting and cleaning teams. Once the hydrojetting water has settled, a further camera inspection is carried out. Further cleaning and inspection stages are carried out to ensure that the internal state of the pipework is satisfactory. Hydrojetting water remaining is removed by allowing by dropping out of valves and spools and allowing access for dewatering procedures. Any valves and spools removed are reinstalled and drying equipment connected to allow remaining water pockets to evaporate. A final assessment of damage caused by water and debris to carbon steel pipework is made, and if necessary, chemical cleaning operations undertaken depending on oxidation damage. The pipework is then handed to the client for commissioning.

Current cleaning methods also provide very limited internal inspection records, sometimes as low as 30%. The process described herein allows for the pipework to be cleaned and inspected sectionally, allowing 100% access, and therefore allowing the process to supply 100% internal video inspection records that prove the piping system is 100% clean, dry, free of debris and obstructions.

It is an object of the present invention to provide an improved method of cleaning process pipework, ducting and pipelines.

SUMMARY OF THE INVENTION

According to the invention, there is provided a method of cleaning the inside of pipework, the method comprising the steps of selecting a section of the pipework to be cleaned,

- determining a hold point of the pipework,
- inserting a cleaning apparatus into an entry point of the pipework section,
- the apparatus coupled to a fluid supply and equipped to blow the fluid in a direction along the pipework section from the first or last hold point to the entry point,
- the apparatus further including image recording means to obtain a visual record of the inside of the pipework,
- insertion of the apparatus into the pipework continuing until the apparatus reaches the hold point,
- securing a collector over the entry point to collect debris blown from the pipework,
- activating the compressed air supply,
- moving the apparatus from the hold point to the entry point, so blowing debris towards and into the collector,
- deactivating the fluid supply,
- removing the collector containing the collected debris from the entry point,
- removing the apparatus from the pipework,
- reviewing images of the cleaned pipework and, where satisfactory, certifying the pipework section.

In this way an efficient cleaning method, along with verification and certification thereof is achieved.

Optionally, the apparatus selected includes a light source to improve the images obtained.

Preferably, the fluid is at a pressure of from 5-12 barg and further preferably at from 5-10 barg, and still yet further preferably at 7 barg to move debris but not at such a velocity as to cause damage to the pipework.

Preferably, the fluid is selected from one or more of compressed air, nitrogen gas, water, cleaning solutions, for example containing surfactants, and preservatives, and particularly preferably compressed air.

Optionally, prior to commencing construction of the pipework, a diagram is drawn showing the location of hold points within the pipework as the pipework is constructed, so enabling efficient cleaning to take place of the entire constructed pipework. The diagram can conveniently be software implemented, optionally utilising a tablet or the like, and further conveniently linked to images and other data associated with the pipework section.

Optionally, as the apparatus is moved en route from the entry point to the hold point, checks are made to determine features which might restrict passage of the apparatus, said check can be made visually using the camera.

Quick response (QR) codes and/or Bar codes are optionally attached to an element of the pipework to aid identification and origin of the element.

Preferably pre-installed valves in pipework are inspected and cleaned prior to pipework cleaning as such valves can still become contaminated due to the nature of the piping construction process.

Preferably, an anti-corrosion treatment is administered by the apparatus where required to an area of pipework, for example where an area is visibly suffering from corrosion.

Where the pipework includes a main header, and branches therefrom, the header is cleaned prior to a branch. This can sometimes be performed by pushing the debris within the branches into the main header then finally cleaning the header.

BRIEF DESCRIPTION OF THE DRAWINGS

The invention is described with respect to the accompanying drawings which show by way of example only one embodiment of a method for cleaning pipelines. In the drawings.

DETAILED DESCRIPTION OF THE INVENTION

The presently disclosed invention, operates on pipework, including partially constructed pipework, following the welding together of one or more spools. In a typical welding process, known in the art, spools are lifted into position and supported on pipe stands. Additional spool pieces are offered up and tacked in place with bullets to provide an even spacing between spools for the welding step. A root pass weld is applied between the bullets. A first bullet is removed using a grinder, and the edge of the first weld also ground to present a leading edge to the second weld. The above two stages are repeated around the spools being joined until the weld is complete.

In the current invention, the stages above are repeated until a hold point is reached, determined by cleanliness criteria, established in advance of the welding taking place. An inspection apparatus, including a camera and an air-jet are inserted to remove debris from the aforementioned construction and to dry the spool run. The inspection is completed using images from the camera. If required, an internal corrosion inhibitor is applied and an identification means such as tamper tape added to confirm visually that inspection has taken place. The above process is then repeated to the next hold point until the system or part-system is constructed. Hydrotesting can then be undertaken and subsequent thereto a dewatering step. Because debris has been removed previously and any regions liable to corrosion protected by corrosion inhibitor, the system can be handed over to the operator more quickly and with a greater certainty, due to the certification, of cleanliness than is the case for known methods.

Figure 1:
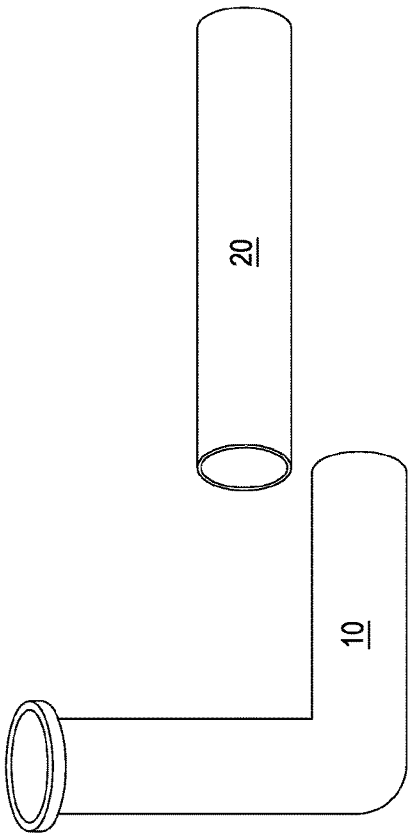
FIG. 1 illustrates two spools being brought together.
Figure 2:
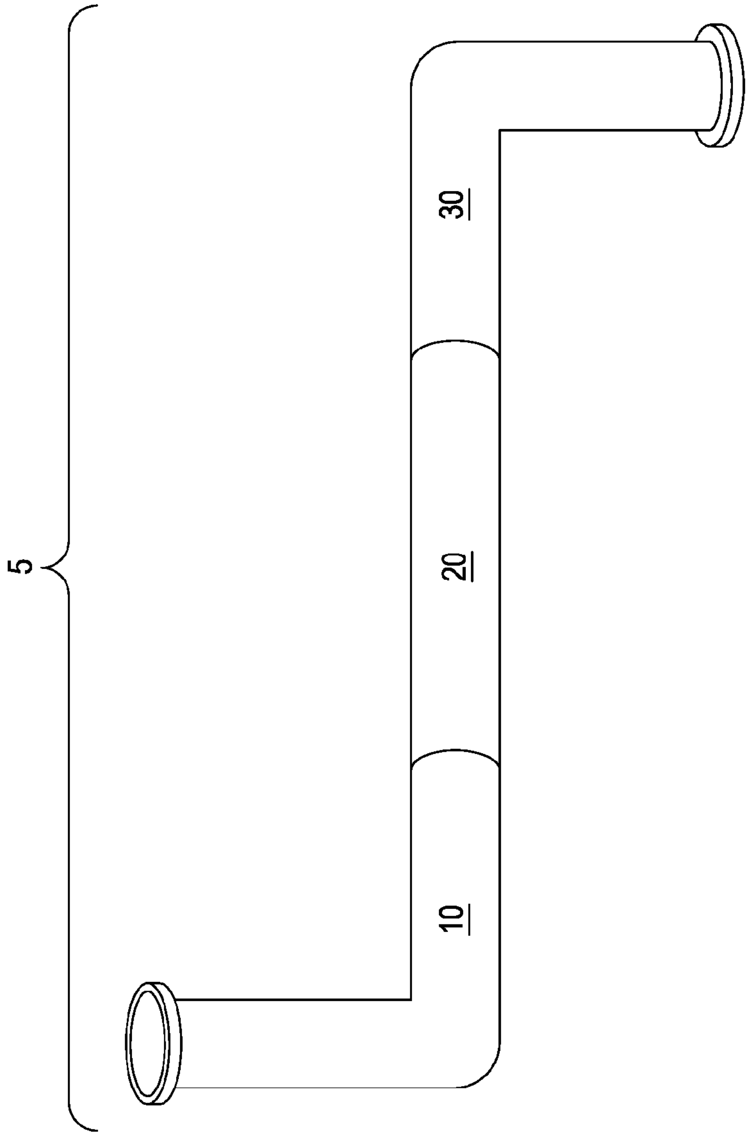
FIG. 2 illustrates the addition of a further spool.

The process of construction and cleaning is illustrated in FIGS. 1-7 in which a pipeline/process piping section 5 is formed from spools 10, 20, 30. It will be understood that the pipeline/process piping section 5 shown is typically only part of the entire length of an eventual pipeline/process piping system. FIG. 1 shows two spools 10, 20, essentially tubular which have for example been transported from a remote site, brought into position such that the free ends of each are maintained adjacent and touching each other in readiness for being permanently secured together by welding. In FIG. 2, a third spool 30 is likewise positioned next to the free end of the spool 20. The three spools thus form a continuous conduit from the first end 15 of spool 1 to the second, flanged end 35 of the spool 30. Spools 10 and 20 and spools 20 and 30 are then prepared by grinding and welded together, in conventional fashion to introduce welded joints 40, 41.

Figure 3:
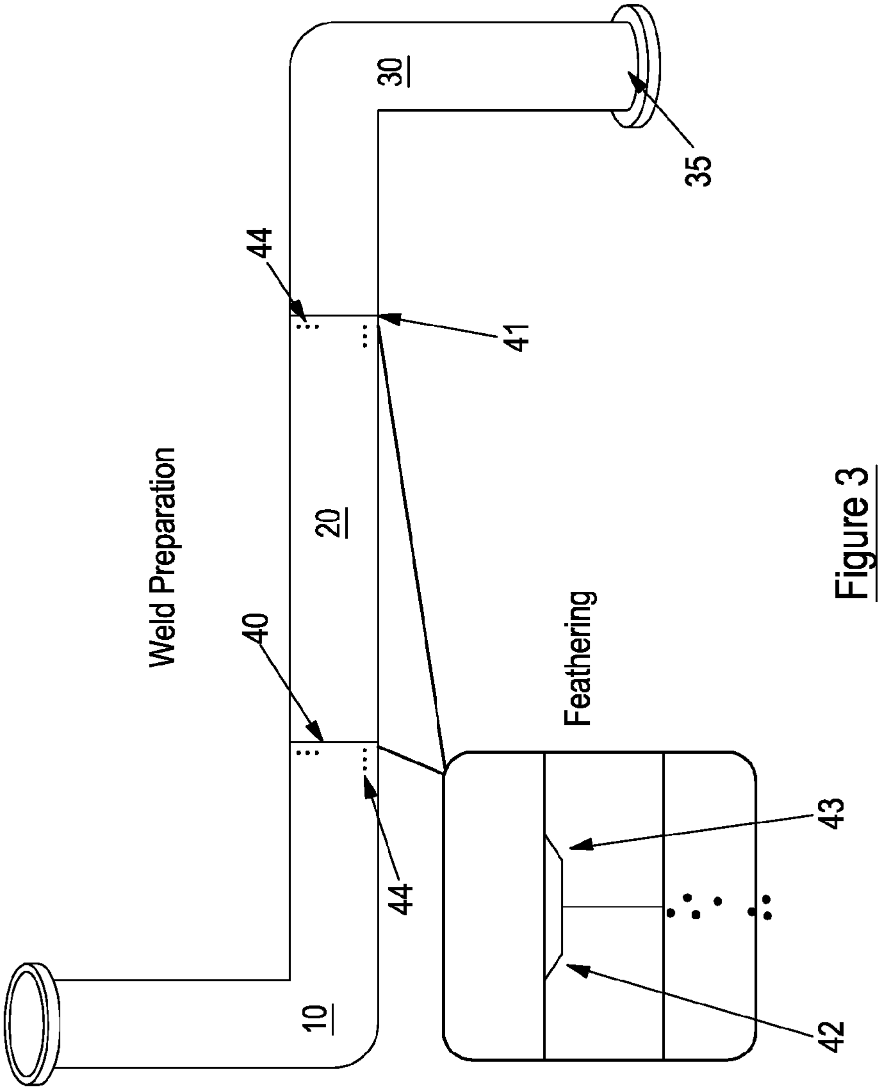
FIG. 3 illustrates welding together of spools.

One common way by which material is introduced into a pipe occurs when using the technique of feathering to carry out the welding process, as illustrated in FIG. 3. In feathering, a leading edge for the following weld is ground into the previous weld, at this stage the welding spacers (Bullets) will also be ground to be removed from the two faces of the piping spools allowing access to weld. Leading edges 42, 43 are formed in each spool 10, 20 around the diameter of a free end of the spool 10, 20. This allows a weld pool to be more easily formed and so allows penetration between the ends of the spools 10, 20 by the weld metal. Formation of the leading edges 42, 43 and removing the spacers itself produces particles of metal which fall into the spools 10, 20 as shown at 44. Such metal particles can cause damage to valves and static equipment should the flow within the pipeline/process piping carry the particles there. Moreover, some of the grinding debris metal can run into the internal volume of the spools 10, 20, 30. Typically, a 10" (25 cm) weld preparation can produce around 3 g of abrasive debris within the pipework.

Figure 4:
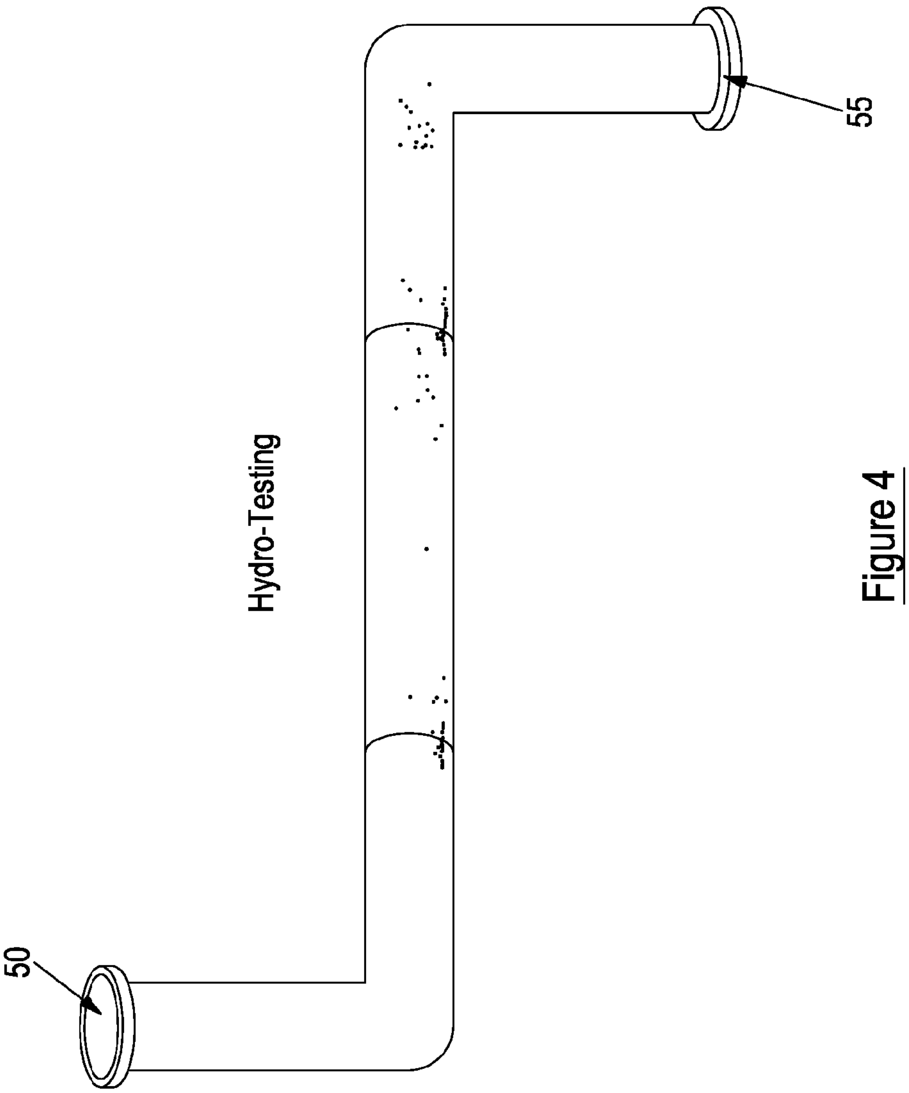
FIG. 4 illustrates testing of the welding pipeline/process pipework.

Once the welds are completed and the pipeline or process piping system is formed, then the fluid-tightness of the pipeline is ready to be tested. One way of carrying this out, see FIG. 4, is to pump water through the pipe, including at high pressure to check for leakage. Water therefore can be forced through the first end 50, flowing through the spools 10, 20, 30 and out through the second end 55, from which it can be collected for reclamation and/or reuse. The flow of water can remove some of the particulate material from the pipeline/process piping system. However, once the water flow has ceased there normally remains not just residual particulate metal, usually the larger particles, but also water from the test which also needs to be removed.

The method as described herein enables efficient cleaning of pipework, typically in sections 10-40 metres in length.

Figure 5:
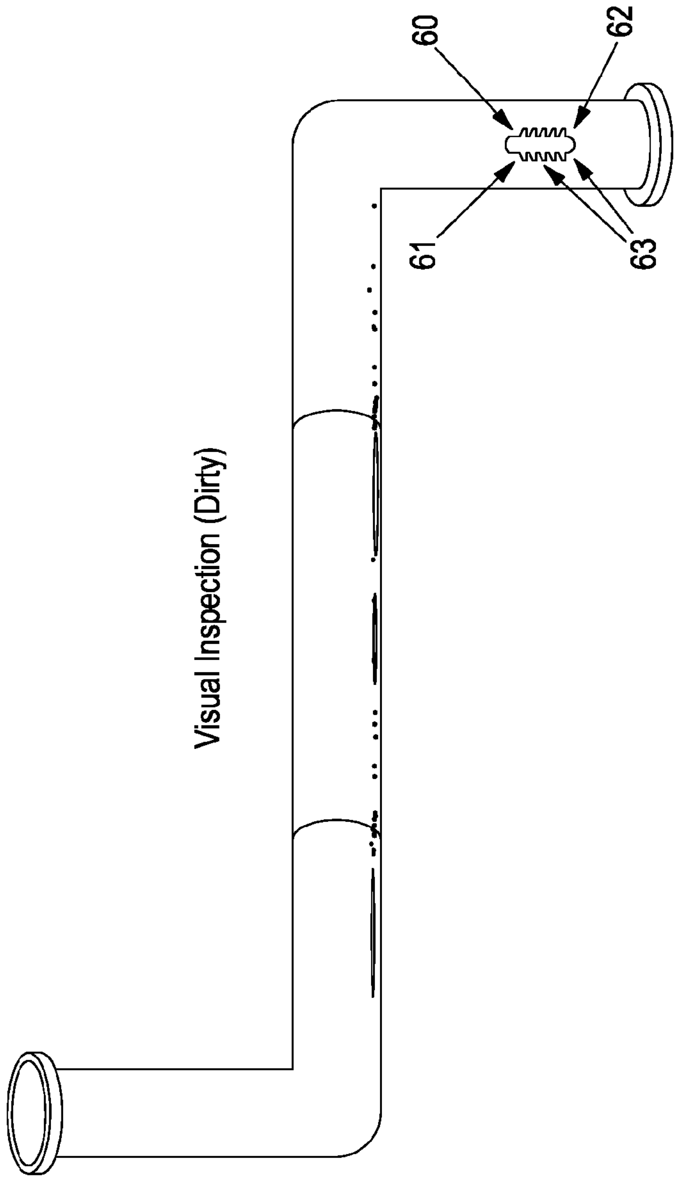
FIG. 5 illustrates the commencement of inspection of the welded pipeline/process pipework.

In summary, a visual, "dirty" inspection is firstly carried out using the apparatus 60 as shown in FIG. 5. The apparatus 60 is equipped with a camera 61 at its front end and is adapted to blow pressurised air in a direction towards its back end 62 via the nozzles 63. The apparatus 60 optionally also includes a light to facilitate the obtention of good quality images. Optionally, a light source can be mounted to cast light along the pipework to the hold point. The pressure used is chosen to suit the task undertaken but is optionally from 5-10 bar g with a maximum pressure, usually, of 12 bar g (170 psi), although this pressure can be increased accordingly. The pressure should be sufficient to be able to move the debris at a reasonable rate, but not so strong as to cause damage through impact on the interior of the pipework by the debris. A pressurised fluid supply (not shown), preferably selected from one or more of compressed air, nitrogen gas, water, cleaning solutions, for example containing surfactants, and preservatives, and particularly preferably compressed air is connected to the apparatus 60 to enable this function. A light source can also be included to improve the images obtained.

Figure 6:
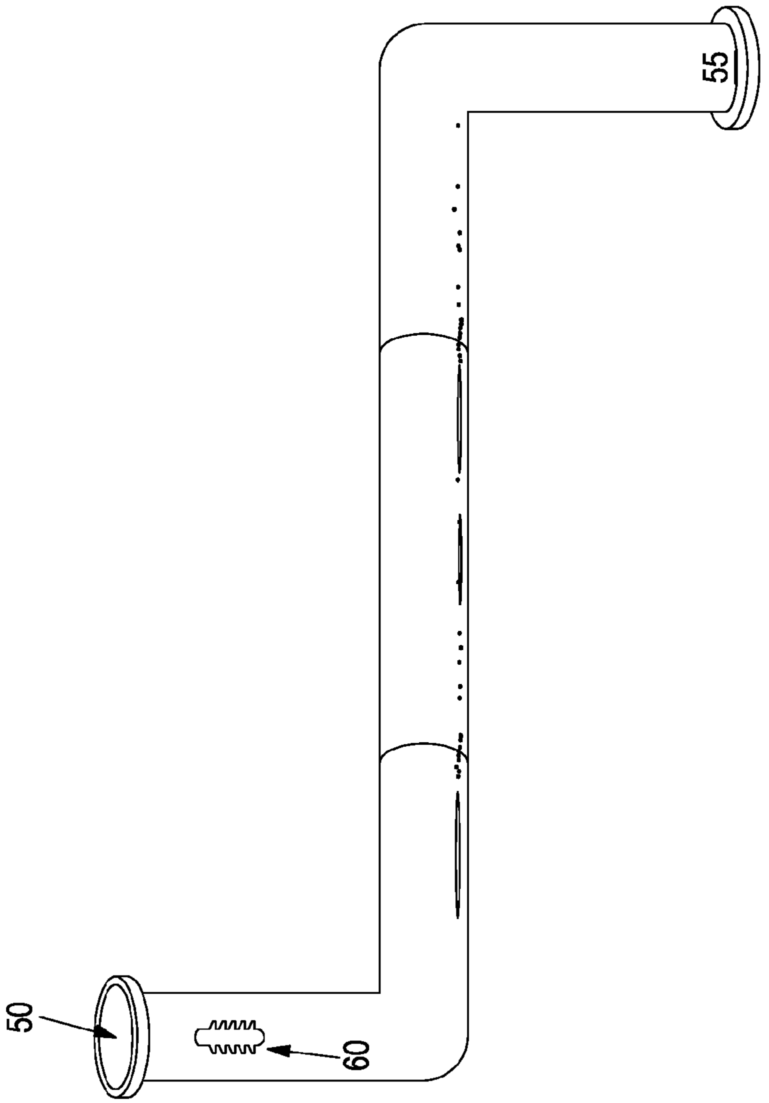
FIG. 6 illustrates further the inspection of the welded pipeline/process pipework.
Figure 7:
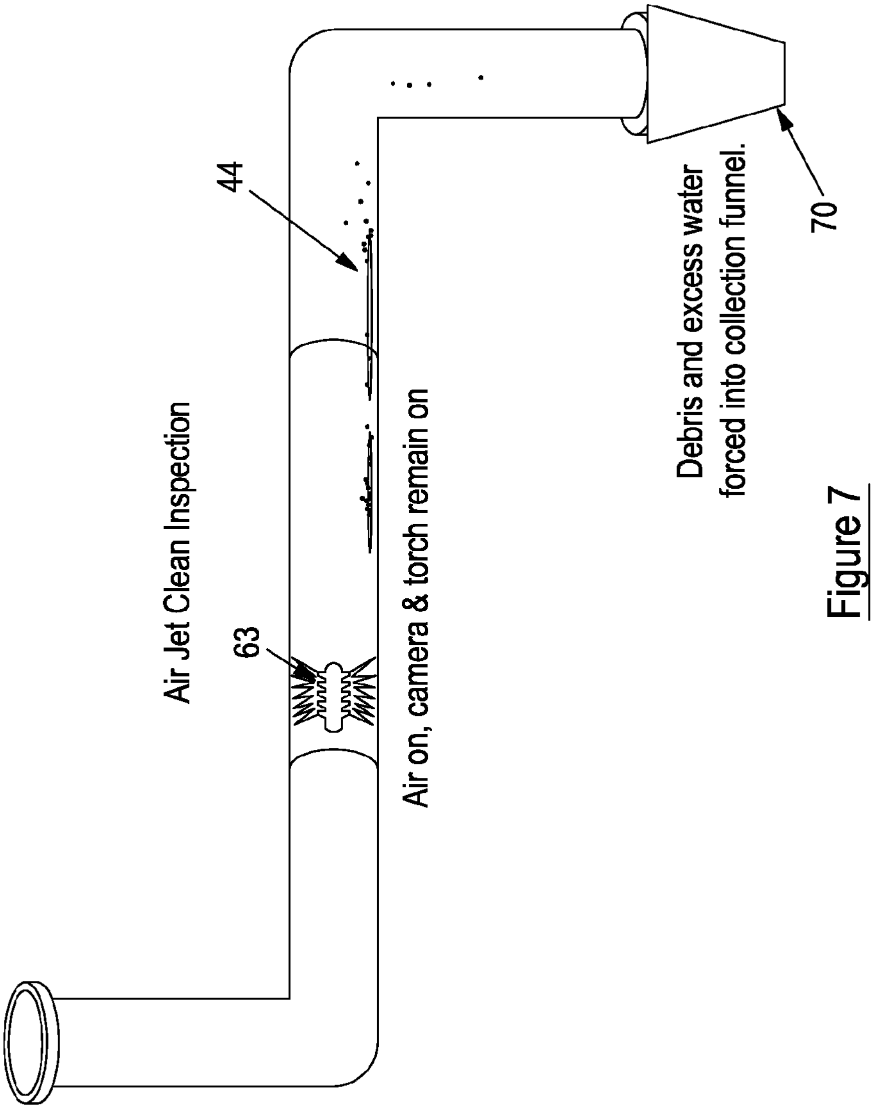
FIG. 7 illustrates cleaning and inspection.
Figure 8:
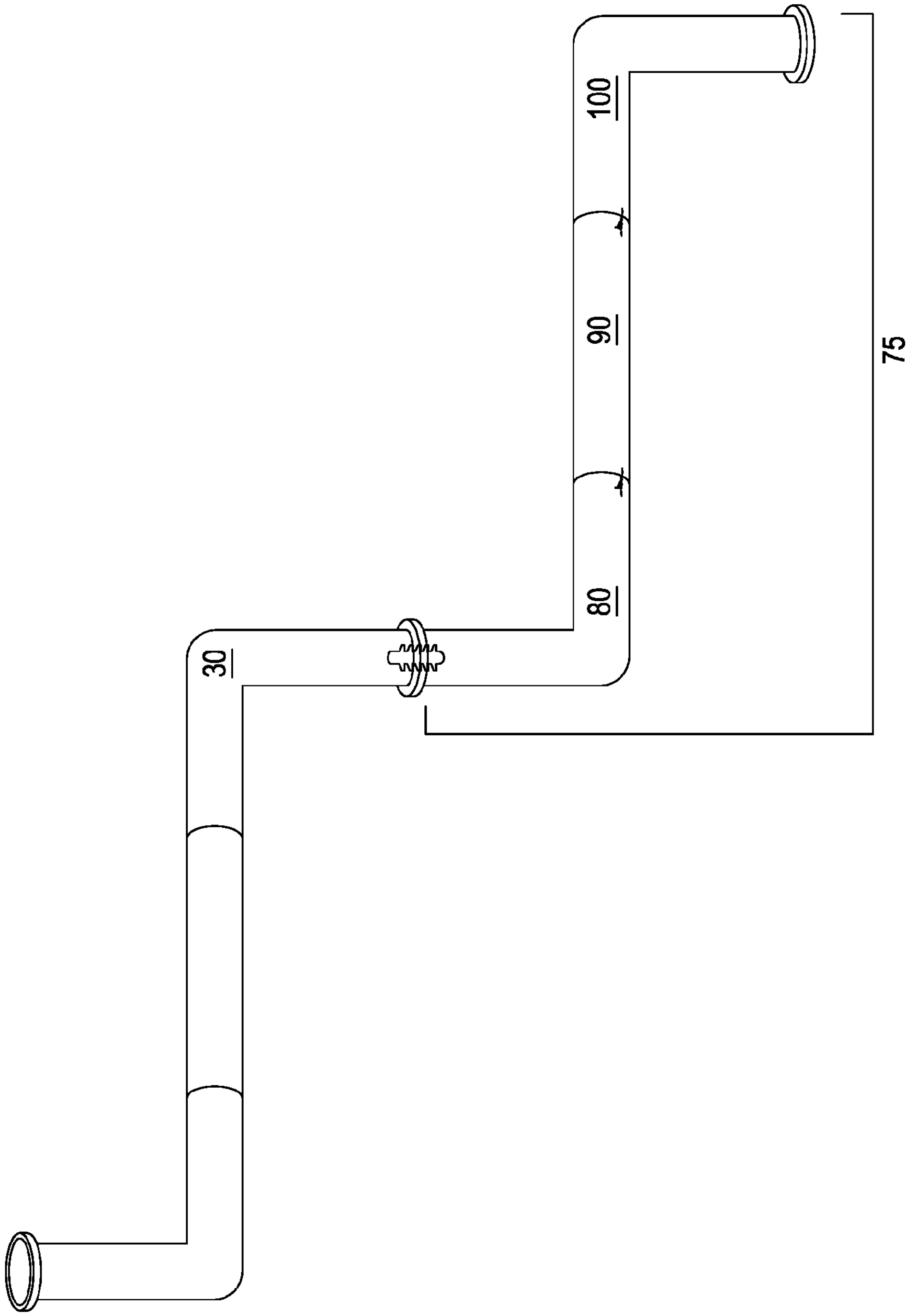
FIG. 8 illustrates cleaning of a further section of pipeline/process pipework.

The apparatus 60 is inserted into the entry 1 in the second end 55 of the spool 30 and then travels via push rod or robotic tracks to the first end 50 of the pipe section 5 as shown in FIG. 6. As it travels, the camera 61 enables a video record of the state of the inside of the section 5 to be made which is transmitted to the operator's handset. Once the cleaning has taken place therefore, a comparison video can be made with the original state of the pipe section 5.

A collection funnel 70 is secured to the second end 55 of the section 5 to safely catch and retain material dislodged from section 5 in the following process. The collected material can subsequently be disposed of safely following prescribed methodology.

Once the funnel is in place and the apparatus 60 in position at the first end 50, the fluid source is switched on. The apparatus 60 is slowly withdrawn from the section 5 in the direction towards the funnel 70. As the apparatus 60 is withdrawn, the water and remaining debris is blown towards the funnel 70 by the pressurised air exiting the nozzles 63. In a preferred option, any areas which can be seen to have suffered corrosion due to water can be treated with an anti-corrosion treatment, administered by the apparatus 60. The fluid/compressed air utilised is preferably dry and oil free and supplied at ambient or warm temperature. Further, the air is jetted at a pressure of at least 7 barg at up to 600 cfm providing an air velocity of around 657 cfm (18.6 $m^3$/in).

If review of the images obtained indicates that the section 5 is in a suitable condition, satisfying agreed criteria for cleaners, then a cleanliness inspection certificate can be issued in respect of the section 5 to that effect and that the section 5 is signed off.

Once the section 5 is signed off, a further section 75, comprising spools 80, 90, 100 is attached, via the connection of the spool 80 to the free end of the spool 30 of the section 5. This entails welding together of the spools 80 and 90 and the spools 90 and 100 as well as the spools 30 and 80, producing debris as previously. An apparatus 60 is again inserted into the pipework at the free end of the spool 100 and propelled to the end 35 of the spool 30, the formerly free end of the section 5, which once signed off is designated as a hold point. Cleaning of the section 75 can then proceed as described above for the section 5.

In more detail, it is assumed that appropriate safety precautions have been taken prior to inspection of a particular section of pipework. Prior to commencement of pipework construction, an assessment is made of the pipe and instrumentation diagrams and isometric drawings.

The aim of the assessment is to capture all the natural ends in a pipe section—which might be otherwise inaccessible due to the number of bends in the run, valves of in-line equipment etc. A set of hold points is determined and marked on the diagrams and drawings such that construction of the piping run is halted at a hold point to allow the internal inspection as set out above, to take place—before further construction makes the inspection unviable/inaccessible. Optionally the diagram inspection and marking can be carried out with the aid of bespoke software. The software and marked-up drawings then provide a clear indication where the cleaning/inspection needs to take place. The software can also provide the user with a real time view of the progress of construction and cleaning. Additionally, the location of golden and field welds can be included: again to aid oversight of the construction/piping installation.

Once a cleaning regime is authorised, the pipework to be cleaned is checked to ensure if any items which have been identified as likely to be damaged by the cleaning process have not been installed or have been removed. Any personnel not required are kept clear of the system using conventional safety methods and equipment—such as tape, signage—and other work on the pipework is suspended.

The free end of an umbilical, connected at one end to the apparatus 60 is connected to an oil-free dry air compressor or fluid supply pump. If required, additional lengths of air hose can be attached as required. Typically, a hose of ¾ inch to 1¼ inch (1.9-3.2 cm) diameter, rated higher than the maximum pressure to be used is chosen. Once joint tightness and hose damage has been checked, the air-compressor/fluid pump is started. An air-valve to supply air to the apparatus 60 is open once it is deemed safe to do so.

The apparatus 60 is then inserted until it reaches a hold point of the pipe spools. As the apparatus 60 is inserted, a visual recording of the internal state of the spools is made to record debris left behind from the construction process or which has subsequently migrated into the spools: debris such as welding rods, welding bullets, sand and stones etc. Also any damage or oxidation of the metal, particularly around the joints can be noted. On discovery of oxidation or corrosion the tool can also be used to apply fluids for corrosion inhibition.

A funnel 70 is preferably secured over the end of the pipework spool into which the apparatus 60 is inserted and which funnel 70 collects debris removed by the operation of the apparatus 60 from the pipework. As the apparatus 60 is moved en route to the hold point, checks are also made, preferably visually utilising images from the camera, to determine any features which might restrict passage to the apparatus 60. Items such as bellows, flow-meters, produced bore valves, orifice plates, filters etc. removed for the cleaning (or cleaned if not possible to remove) are fitted with a quick response (QR) code or barcode identification tag to allow cataloguing, possibly including a photograph and other information (origin, date of installation etc). The items removed from the system can be systematically tagged, logged and recorded in Asset Integrity software.

Where the pipework includes a main header having branches therefrom, the header is usually cleaned first, followed by the branches. The branches would usually be accessed and the debris within blown into the main header. This depends on construction, and it is also possible to clean the branches first and then clean the main header.

Once the cleaning commences, the apparatus 60 is withdrawn from the hold point back towards the entry point. The rate of withdrawal is controlled to ensure that the debris being removed does not build up around the front of the apparatus, for example around the camera 61. In this manner, the debris is blown by the compressed air towards the entry point. As the apparatus 60 is withdrawn, a visual recording of the state of cleanliness of the pipework is recorded for review by the operator or the pipework owner. If it is found that the debris remains the process can be repeated.

Once the apparatus 60 arrives at the entry point, the valve on the apparatus is shut and the compressed air is switched off. The apparatus, connection and hoses are removed prior to the apparatus 60 being transported to the next location.

Figure 9:
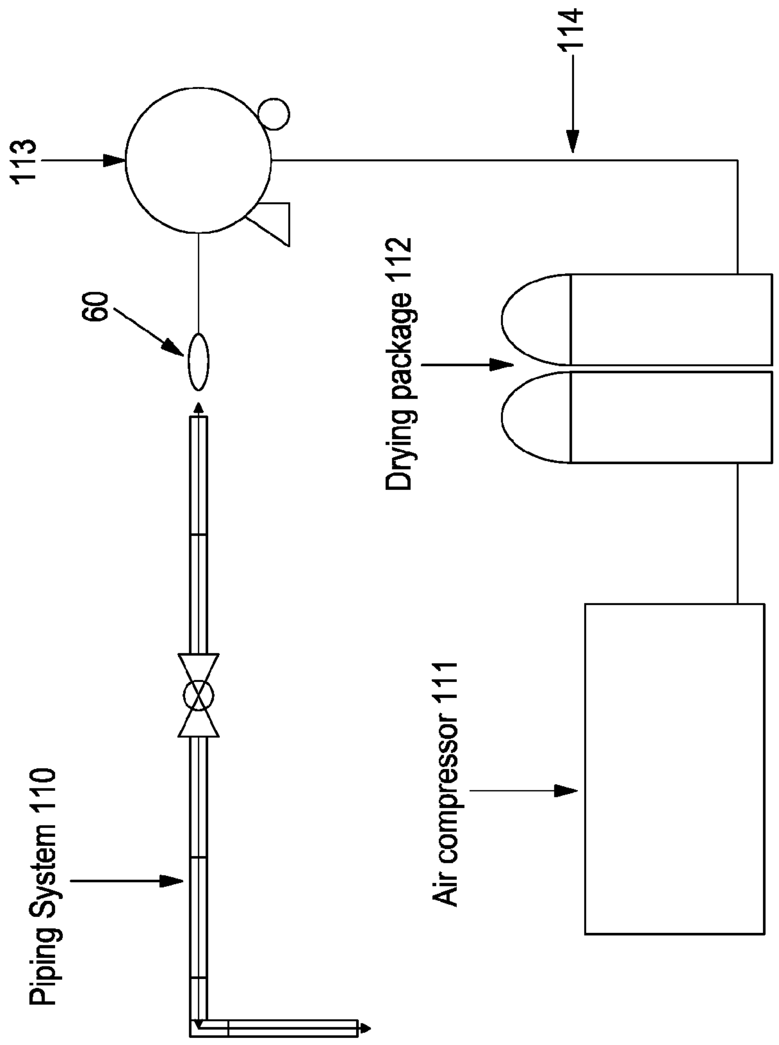
FIG. 9 is a flow chart to illustrate the method.

FIG. 9 summarises an aspect of the method of cleaning a piping system 110. Compressed air, produced in an air compressor 111, is passed through a drying package 112 to remove any moisture from the compressed air so that this does not introduce water subsequently into the piping system 110. The dried air then passes along the line 114 to a distributor 113 comprising a hose reel which is connected to the rear of the apparatus 60. The apparatus 60 is then utilised to clean the piping system in the manner described above.

Each piping system undergoing construction or pre-constructed will have an outlet/inlet or removed flanged spool to allow the last weld/golden weld construction debris to be removed from the system. This point can be accessed to a distance of between 10-40 metres, depending on piping configuration.

It is important that where valves are installed within pipework, that the direction of cleaning (i.e. withdrawal of the apparatus 60) should be away from the valve to the defined entry point. The apparatus 60 is not used to blow debris through a valve as there is then a great risk of damage. Should this be the only access point however, then a vacuum unit can be used to suck debris from the system and prevent debris from accessing the valve seat.

All in-line valves should be cleaned away from, this means that piping spools should be fitted working away from the valves to an agreed access point or ultimately to include at the flanged access/cleaning/maintenance spool or spool containing access via a top or bottom positioned drain or vent. The drain or vent should have a minimum access internal diameter of ¾ inch (1.9 cm). Pre-installed valves within piping systems can be inspected and attempted to be cleaned, the cleanliness certificate will state pre-installed, partially cleaned.

Once it is agreed that the pipework is clean, then a record thereof is stored and signed off in real time, thus increasing efficiency. A record of the cleaning of the assets can thereby be obtained which optionally includes: marked-up typing and instrumentation diagrams, isometric drawings showing the pipework as it was cleaned, records of any large or unexpected items removed (allowing practices to be improved), certificate of cleanliness and videos. The pipework is then ready for a further section to be installed.

The invention claimed is:

1. A method of cleaning sections of a pipework as the pipework is being assembled, the method comprising the steps of:
- selecting a first section of the pipework to be cleaned;
- determining a hold point for the first section of the pipework;
- inserting a cleaning apparatus into an entry point of the first section of the pipework, the cleaning apparatus being coupled to a fluid supply by a tube, the cleaning apparatus blowing fluid delivered by the tube from the fluid supply when the fluid supply is activated, the cleaning apparatus further including image recording means to obtain a visual record of an inside of the pipework;
- advancing the cleaning apparatus along the first section of the pipework until the cleaning apparatus reaches the hold point for the first section, the fluid supply being deactivated while the cleaning apparatus is advanced along the first section of the pipework to the hold point for the first section;
- securing a collector over the entry point of the first section;
- activating the fluid supply after the cleaning apparatus reaches the hold point for the first section so that the fluid from the fluid supply is blown from the cleaning apparatus along the first section of the pipework toward the entry point of the first section, the fluid comprising water or a liquid cleaning solution;
- moving the cleaning apparatus from the hold point for the first section toward the entry point of the first section while the fluid supply is activated, so blowing debris towards and into the collector;
- deactivating the fluid supply;
- removing the collector from the entry point of the first section;
- removing the cleaning apparatus from the first section of the pipework;
- securing a second section of the pipework to the first section of the pipework;
- inserting the cleaning apparatus into an entry point of the second section of the pipework;
- advancing the cleaning apparatus along the second section of the pipework until the cleaning apparatus reaches a hold point for the second section, the fluid supply being deactivated while the cleaning apparatus is advanced along the second section of the pipework to the hold point for the second section;
- activating the fluid supply after the cleaning apparatus reaches the hold point for the second section so that the fluid from the fluid supply is blown from the cleaning apparatus along the second section of the pipework toward the entry point of the second section;
- moving the cleaning apparatus from the hold point for the second section toward the entry point of the second section while the fluid supply is activated; and
- reviewing images of the pipework obtained by the image recording means when the cleaning apparatus was within the pipework and, where satisfactory, certifying the first section of the pipework.

2. The method according to claim 1, wherein the cleaning apparatus includes a light source to improve the images obtained by the image recording means.

3. The method according to claim 1, wherein the fluid being blown from the cleaning apparatus along the first section is at a pressure of 5-12 barg.

4. The method according to claim 3, wherein the fluid being blown from the cleaning apparatus along the first section is at a pressure of 5-10 barg.

5. The method according to claim 3, wherein the fluid being blown from the cleaning apparatus along the first section is at a pressure of 7 barg.

6. The method according to claim 1, wherein the fluid is the cleaning solution and the cleaning solution contains surfactants or preservatives.

7. The method according to claim 1, wherein prior to commencing construction of the pipework, a diagram is drawn showing the location of hold points within the pipework as the pipework is constructed.

8. The method according to claim 7, wherein the diagram includes images of the first section and the second section of the pipework.

9. The method according to claim 7, wherein as the cleaning apparatus moves en route from the entry point of the first section to the hold point for the first section, checks are made to determine features which might restrict passage of the cleaning apparatus.

10. The method according to claim 7, wherein quick response (QR) codes and/or bar codes are then attached to an element of the pipework.

11. The method according to claim 1, wherein pre-installed valves in the pipework are inspected and cleaned prior to cleaning of the first section of the pipework.

12. The method according to claim 1, wherein the pipework includes a main header and branches therefrom, the main header is cleaned prior to a branch.

13. The method according to claim 12, wherein debris within the branches is pushed into the main header by the cleaning apparatus.

14. The method according to claim 1, wherein an anti-corrosion treatment is administered by the cleaning apparatus where required to an area of the pipework.

15. The method according to claim 1, wherein the step of advancing the cleaning apparatus along the first section of the pipework comprises using a push rod to advance the cleaning apparatus along the first section of the pipework until the cleaning apparatus reaches the hold point for the first section, the push rod being separate from the tube.

16. The method according to claim 1, wherein the hold point for the second section comprises the entry point of the first section, the entry point of the first section being coupled with the second section.

* * * * *